No. 881,309. PATENTED MAR. 10, 1908.
S. M. DORRIS.
ANTIRATTLER FOR VEHICLE SHAFTS AND TONGUES.
APPLICATION FILED JULY 18, 1907.
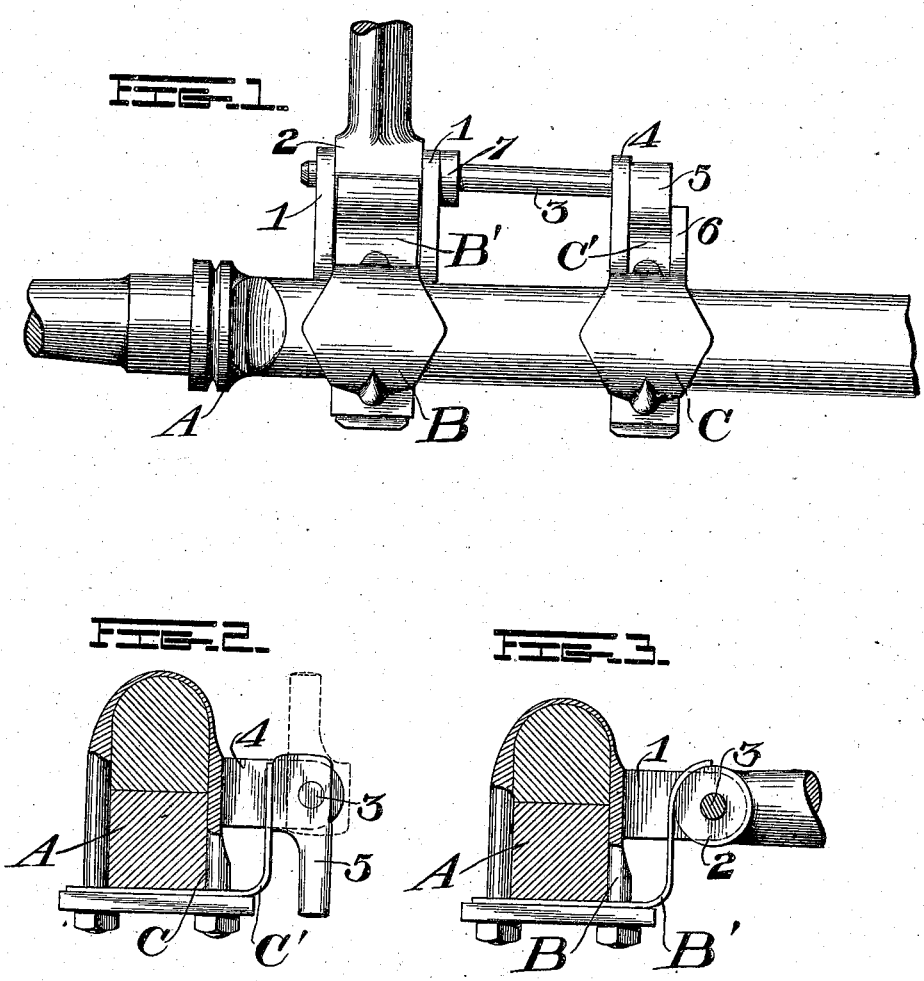

UNITED STATES PATENT OFFICE.

SAMUEL M. DORRIS, OF BROKEN BOW, NEBRASKA, ASSIGNOR OF ONE-HALF TO WILLIS E. TALBOT, OF BROKEN BOW, NEBRASKA.

ANTIRATTLER FOR VEHICLE SHAFTS AND TONGUES.

No. 881,309.  Specification of Letters Patent.  Patented March 10, 1908.

Application filed July 18, 1907. Serial No. 384,418.

*To all whom it may concern:*

Be it known that I, SAMUEL M. DORRIS, a citizen of the United States, residing at Broken Bow, in the county of Custer and State of Nebraska, have invented certain new and useful Improvements in Antirattlers for Vehicle Shafts and Tongues, of which the following is a specification.

My invention relates to an improvement in anti-rattlers for vehicle shafts and tongues, and the object is to provide a quick shifter for attaching or detaching the shaft or tongue, and one which will not only hold the latter securely but will also preclude the possibility of rattling.

With the foregoing objects in view, my invention consists in a pair of ordinary axle clips having springs connected therewith in connection with a rotatable bolt having a cam thereon adapted to engage one of the springs whereby it is held axially against turning, and a lug for preventing the bolt from displacement while holding the shaft or tongue in place.

My invention still further consists in certain novel features of construction and combinations of parts which will be hereinafter described and pointed out in the claims.

In the accompanying drawing:—Figure 1 is a plan view, Figs. 2 and 3 are transverse sections through the two clips.

A, represents the vehicle axle, and B and C are axle clips, one of which is provided with the usual jaws 1, 1, between which the eye 2 of the shaft or tongue enters, these jaws having the usual orifices therein, to receive the pin or bolt 3, which secures the tongue or shaft in place. The pin or bolt 3 not only passes through the orifice in the jaws 1, 1, but also through a bearing 4 projecting from the inner clip C. On the outer end of the pin or bolt a cam lever 5 is secured.

Springs B' and C' secured beneath the axle by the clips B and C respectively, engage the eye of the shaft or tongue, and the cam respectively, and a lug 6 prevents the removal of the pin or bolt when in the locked position with the hand lever downward, while a collar 7 prevents the pin or bolt from being entirely removed from the bearing. These springs are of sufficient tension to bear more or less rigidly against the eye of the shaft or tongue, and also against the cam, and the larger spring B' serves as an anti-rattler, and by bearing firmly against the eye of the shaft or tongue holds the same firmly upon the pin or bolt and prevents any rattling. The smaller spring C' bears on the cam which holds it in the position where it is placed.

In operation assuming the pin or bolt to be in its locked position with the hand lever extending downward, this is first raised or turned half way around until it extends in an upward direction. Then by pulling the pin or bolt inward, the shaft or tongue may be removed, as the pin or bolt is withdrawn from the eye. To lock it the action is reversed, namely the eye is inserted between the jaws, and the pin or bolt moved outwardly until the latter is held in place, after which the cam lever is turned to its downward position, whereupon it is held by the lug 6 against endwise movement and by the spring C' against rotary movement. In this way a quick acting device is provided which does away with the necessity of tools, such as a wrench, and at the same time the locking device is always in position to be operated, there being no danger of any part dropping or being lost or misplaced. The construction is such also that a horse may be easily released, if desired, in case of a runaway, or other accident, by simply lifting the cam levers, and forcing them inward.

It is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. The combination with an axle clip, of a rotatable endwise movable pin or bolt adapted to enter the eye of a shaft or tongue and holes in the clip, said pin or bolt having a cam lever thereon by means of which it is turned and locked, means for preventing endwise movement of the pin or bolt when rotated to one of its positions, and a spring bearing against the eye and the cam lever.

2. The combination with two axle clips located adjacent to each other, one of which has two jaws and the other a single jaw and a lug, said jaws having holes in alinement with one another, the clip having two jaws being adapted to receive the eye of shaft or pole, a bolt having rotatable sliding connection in the holes in the three jaws, a cam lever on the pin or bolt, springs bearing against the cam lever and the eye, the lug retaining the pin or bolt against endwise movement when in one of its rotary positions, and means on the pin or bolt between the clips for preventing the entire withdrawal of the pin or bolt from the jaws.

In testimony whereof I have signed my name to this specification in the presence of two subscribing witnesses.

SAMUEL M. DORRIS.

Witnesses:
ANDREW J. ROBERTSON,
EFFIE R. DODDS.